United States Patent [19]

Kunzler

[11] Patent Number: 4,749,530

[45] Date of Patent: Jun. 7, 1988

[54] MOLD FOR AND METHOD OF MAKING CONTACT AND INTRAOCULAR LENSES

[76] Inventor: Wilhelm F. Kunzler, 24 Little Spring Run, Fairport, N.Y. 14450

[21] Appl. No.: 929,431

[22] Filed: Nov. 12, 1986

[51] Int. Cl.$^4$ .............................. B29D 11/00
[52] U.S. Cl. .................... 264/2.7; 51/284 R; 249/53 R; 249/117; 249/137; 425/808
[58] Field of Search .............. 264/1.1, 2.7; 425/808; 51/284 R; 249/53 R, 117, 137

[56] References Cited

U.S. PATENT DOCUMENTS

| | | | |
|---|---|---|---|
| 4,118,898 | 10/1978 | Godot | 51/216 LP |
| 4,155,962 | 5/1979 | Neefe | 264/313 |
| 4,202,848 | 5/1980 | Neefe | 264/2.7 |
| 4,441,795 | 4/1984 | Lobdell | 425/808 |

FOREIGN PATENT DOCUMENTS

| | | | |
|---|---|---|---|
| 143253 | 6/1985 | European Pat. Off. | 264/2.7 |
| 95118 | 6/1984 | Japan | 264/2.7 |
| 2084493 | 4/1982 | United Kingdom | 52/284 R |

Primary Examiner—James Lowe
Attorney, Agent, or Firm—Robert M. Phipps

[57] ABSTRACT

Molded contact and intraocular lens blanks are lathe cut into the finished lens without demolding and prior measurement of the blank by the use of a hemispherical based mold with at least one key way adapted for spindle bore feeding to a lathe equipped with a hemispherical locating ring and corresponding key. Among other things the mold and method disclosed provide a convenient way to generate prism or multiple curve segments as required for segmented bifocal lenses or the like.

14 Claims, 1 Drawing Sheet

4,749,530

MOLD FOR AND METHOD OF MAKING CONTACT AND INTRAOCULAR LENSES

BACKGROUND

1. Field of Invention

This invention relates to a means for lathe cutting of contact and intraocular lens blanks by use of a new contact lens mold.

2. Description of the Prior Art

U.S. Pat. No. 4,188,353 granted Feb. 12, 1980 to Charles W. Neefe discloses a method of making plastic aspheric lenses by casting a liquid monomer in a container, polymerizing the monomer to form a solid having an aspheric optical surface formed within the container and cutting a second optical surface on the solid lens material with the container supporting the lens material during the cutting and polishing operation. The aspheric surface of the container is formed by clamping the container in a jig and applying pressure until the desired aspheric curve is achieved.

U.S. Pat. No. 4,229,390 granted Oct. 21, 1980 to Charles W. Neefe discloses the use of plastic molds for molding contact lens blanks. The molds also serve as the holding block to facilitate cutting to the required lens thickness. However, measuring before and after the cutting operation is required to determine the thickness of the lens being cut.

U.S. Pat. No. 4,239,712 granted Dec. 16, 1980 to Charles W. Neefe discloses a method for preparing contact lenses with bifocal correction in the front (anterior) surface of the lens. The lenses are prepared from blanks cast in individual molds. The molds serve as the lathe arbor during the cutting process. Again a series of thickness measurements are required.

In the general practice of the art, the mold containing the cast lens blank is mounted into a lathe by the use of a collet. The use of a collet necessitates several measurements in order to insure obtaining a contact lens of the desired thickness. The collet also subjects the mold to stress which in turn results in poor optical quality due to slippage and lack of alignment necessary for preparation of toric and bifocal types of contact lenses.

In my copending patent application Ser. No. 670,162 filed Nov. 9, 1984, there is disclosed a mold for casting contact lens blanks comprising a hollow frustum conical base having attached to the apex thereof a cup-like molding cavity with a positive of the posterior optical surface of a contact lens in the base thereof and at the other end an opening, there being at least one vertical fin on the exterior surface of the conical base, said fin being below the mold cavity. The mold while containing the cast lens blank is inserted into the concentric tapered ring chuck of a lathe and cut into the desired contact lens. Because of the construction of the mold and the lathe it is possible to cut only concentric radii on the anterior lens surface.

SUMMARY OF THE INVENTION

In accordance with this invention there is provided a mold for casting contact and intraocular lens blanks comprising a hollow hemispherical base having attached to the apex (or the axis of the hemisphere perpendicular to the open edge of the interior hollow of said hemisphere) thereof a cup-like molding cavity with the positive of the posterior optical surface in the bottom thereof, a vertical side wall extending from said bottom and at the other end of said side wall an opening, there being at least one constant sized key way on the exterior surface which follows said surface of said hemispherical base, said key way being located below the mold cavity, said exterior surface of the hemispherical base being capable of engaging and mating with a guide key in the hemispherical shaped locating ring of a lens generating lathe. Also disclosed is a process for manufacturing contact and intraocular lenses with the aid of the disclosed mold.

DESCRIPTION OF THE PREFERRED EMBODIMENTS

The molds of this invention and the process using the invented molds are useful in preparing contact lenses as generally defined and intraocular lenses which for convenience are hereafter referred to as IOL. For convenience in hereafter describing the invention, unless otherwise specified, contact lenses and IOL will be collectively referred to as contact lenses.

Figure 1:
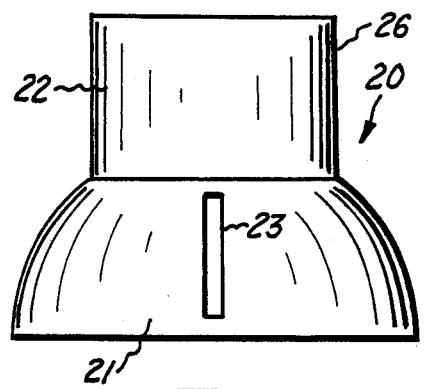
FIG. 1 is a side view of a mold of this invention.

In FIG. 1 the mold 20 has as the bottom surface 25 the positive of a posterior optical surface which may be for a single vision correction (symmetrical radii), toric (non-symmetrical radii), aspheric or bifocal contact lens or for an IOL. The negative of the haptic portion of the IOL is formed in the bottom surface 25 as the bottom surface 25 is formed by the negative master tool which is further described below. Additionally, the bottom surface 25 may be the positive of a rotationally symmetric asphere such as parabola or an ellipse, or it may be a series of concentric curves.

The circumference of bottom surface 25 may terminate with a series of variable diameters which will result in a rounded edge of the lens blank (and subsequent lens) at the juncture of bottom surface 25 and the inner side 24 vertical side wall 26 of cup-like molding cavity. The configuration of the mold 20 at the junction of bottom surface 25 and the inner portion 24 of wall 26 permits molding of lens which will have extremely thin finished edges after lathing of the posterior surface of the lens.

Figure 2:
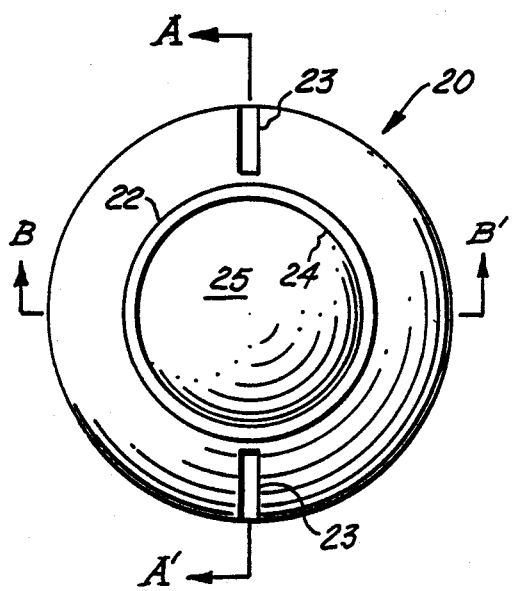
FIG. 2 is the top view of the mold of FIG. 1.

In FIG. 2 the mold 20 is shown with two key ways 23 directly across from each other on the exterior surface of hemispherical portion 21 of the mold 20 base. Extending above the bottom surface 25 at the apex of the hemispherical portion 23 is the vertical side wall 26, with outer side 22 and inner side 24, which encircles and completes defining of the cup-like molding cavity for the contact lens blank.

Figure 3:
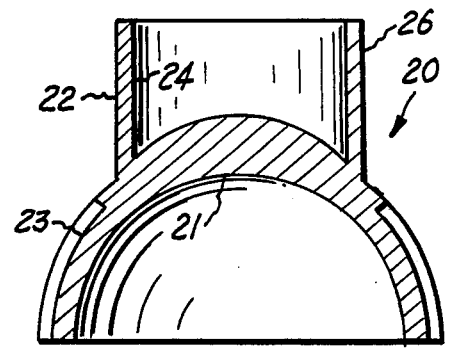
FIG. 3 is a cross sectional view taken along line A—A of FIG. 2.

FIG. 3, taken along line A—A of FIG. 2, illustrates the key ways 23. The key ways 23 may be varied in number and size to meet particular design requirements of the lenses. Two key ways 23 are preferred for mold 20 although the number of key ways 23 may vary from 1 to 4 or more depending on the configuration and complexity of the lens design. Additionally, the key ways 23 provide axial alignment when required during the cutting of the lens. The actual lens diameter within the mold cavity of FIG. 3 as defined by wall 26 can be adjusted either by providing a smaller diameter for wall 26 or by the addition within the inner wall 24 of a circular ridge or ring having a diameter corresponding to the desired lens diameter and edge shape.

Figure 4:
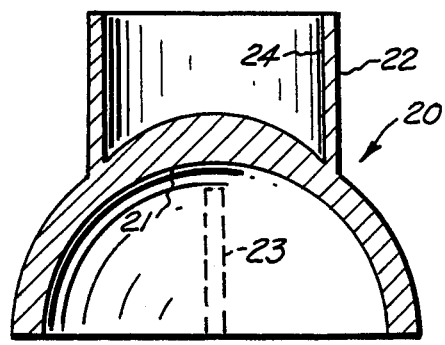
FIG. 4 is a cross sectional view taken along line B—B of FIG. 2.

FIG. 4, taken along line B—B of FIG. 2, illustrates the mold at a point free of key ways 23.

The hemispherical portion 21 of mold 20 provides positive thickness placement of the contact lens when the mold 20 is placed in the hemispheric locating ring chuck of the lathe (not shown).

The above mold 20 and the process which follows are suitable for the production of soft contact lenses, hard contact lenses, hard gas permeable contact lens and IOL, including the haptic portion(s) thereof.

A master negative tool, i.e. a tool for making the positive bottom surface 25 of mold 20, having the curvature required on the concave, posterior, surface of the finished lens is made from glass, stainless steel or other materials which will withstand the molding pressures and temperatures. Tools which have been electroformed or electroplated or plated or vacuum coated or deposited may also be used. These tools are used to prepare the molds 20 used in the process of this invention.

The master negative tool is placed in a sleeve, a molding grade of a resinous material such as polyimide, polycarbonate, polymethyl methacrylate and related derivatives including the corresponding acrylates, polymethylpentene, polyethylene, polypropylene, polyvinyl chloride, or other heat softened molding material is also placed in the sleeve. The chosen mold resinous material must, of course, be compatible with the contact lens to be cast. Among other materials the polyimides, e.g. nylon, and polyvinyl chloride are compatible with lenses made with hydroxyethyl methacrylate (HEMA). Nylon is also compatible with lenses made from N-vinyl pyrrolidinone. Either injection or compression molding methods which are well known in the art may be used to produce the negative resinous mold 20 of this invention.

A liquid or syrup monomer material containing a suitable catalyst is placed over the bottom surface 25 of the mold 20 and covered or blanketed to prevent evaporation of the monomer and or inhibition of polymerization of the mixture. The liquid monomer is then polymerized within the mold to form a solid monolithic mass. It is not necessary to remove the hardened plastic lens blank (not shown) from the mold 20.

The mold 20 of this invention offers several advantages. First the mold 20 precisely fixes the posterior curvature of the contact lens. Secondly, it offers a convenient means of holding the lens blank while cutting the anterior surface. More importantly, because the mold's 20 key ways 23 must engage the keys or guide pins of the lathe the precise location of the posterior lens surface curves and lens blank thickness is established without further measurement.

More important yet is the fact that the hemispherical shaped base 21 in cooperation with key ways 23 permit the mold 20, while still in the lathe, to be rotated about a given axis. This rotation is accomplished by moving (or swinging) the mold 20 on the keys or guide pins of the lathe hemispherical ring in either direction. This movement of the mold 20 about the axis can be precisely controlled and calibrated by means now well known in the lathing art. By so moving mold 20 in this controlled fashion two or more surfaces may be cut on the anterior surface of the lens to achieve the desired amount of prism and the like. Without the use of the keys and key ways 23 the lens maker would have to resort to difficult center lathing techniques to achieve the same results. The mold 20 and method of this invention also provide a convenient way to generate prism or multiple curve segments as required for segmented bifocal contact lenses and similar lenses.

The use of this invention lowers scrap rates because of precise location and control means made possible by the mold 20. Additionally, production time is reduced in cutting complex lens configurations by elimination of conventional set up off center lathing. In the method of this invention the optic center can be moved out of the center of rotation of the lathe by lateral transposition of the axis.

While the mold 20 is shown with two key ways 23, other number of key ways 23 may be used. It is noted that with only one key and key way 23 the mold 20 does not as fully achieve in a convenient fashion the benefits of this invention. When the lens generating lathe is equipped with retractable keys or guide pins then mold 20 can be used very efficiently with four key ways 23 to obtain very complex anterior surface lens configurations.

Mold 20 may be supplied to the lens generating lathe either manually or by automatic equipment, e.g. pneumatic systems, as desired.

In a pneumatic system a tube contains a series of molds 20, each containing a lens blank. All molds 20 are positioned in the same manner and the cup-like cavity of each mold 20 faces a sensing device and movement control. The tube has a diameter just greater than the outside diameter of the mold 20 so that air pressure may be used to move mold 20 through the tube. A convenient number of molds 20 stored in each tube would be about 20. When a signal is sent from the lathe a solenoid opens and the movement control allows mold 20 by air pressure via line to pass into the solenoid and through to the lathe's hemispherical seating ring. When the solenoid valve has closed, mold 20 is fully seated and is maintained therein by the air pressure which moved mold 20. While the solenoid valve remains closed at the completion of the lathe cutting on signal from the lather the vacuum solenoid valve opens and the applied vacuum removes mold 20. The cycle is completed when vacuum solenoid valve closes cutting off the vacuum line and allows air pressure to then return mold 20, now containing the cut lens, to the lens tube. Thereafter the lens is polished, removed from the mold 20 and inspected in the customary manner.

Because each time the mold 20 seats against the hemispherical seating ring at the same place the cutting tool of the lathe can be set at one position and successive lenses can be cut to the same thickness. Previously the lathe operator needed to measure the starting thickness of the lens blank and reset the cutting tool each time in order to achieve lenses of an uniform thickness. By this invention the lathe operator also avoids the remeasurement of each lens to assure the desired thickness has been obtained.

The advantages of this invention can also be obtained by manually inserting mold 20 with lens blank into the hemispherical seating ring. The manually inserted mold 20 is retained in place by means of mechanically removing the space behind the mold to bring it into fullest contact possible with the hemispherical locating ring. The key ways 23 also act as drivers to avoid slippage of the mold.

Any lens generating equipment, e.g., lathe, which can be adapted with a longitudinal bore through the spindle can be used in this invention. Examples of such lathes include those available under the Hardinge HSL and DV59 trademarks.

When the bottom surface 25 terminates with a series of variable diameters to form an upwardly rounding junction with the vertical side wall 24 of the mold cavity, the resulting lens blank will have a rounded edge. The rounded edge then permits the front, or anterior, lens surface to be simultaneously lathe cut as described above and finished in one operation.

The foregoing methods and examples have been described in this specification for the purposes of illustration and not limitation. Many other modifications and ramifications will naturally suggest themselves to those skilled in the art based on this disclosure. These are intended to be comprehended as within the scope of this invention.

The embodiments of the invention in which an exclusive property or privilege is claimed are defined as follows:

1. A mold for casting contact and intraocular lens blanks comprising a hollow hemispherical base having attached to the apex (or the axis of the hemisphere perpendicular to the open edge of the interior hollow of said hemisphere) thereof a cup-like molding cavity with the surface in the bottom thereof having a curvature opposite the optical surface desired in the lens being prepared, a vertical side wall extending from said bottom and at the other end of said side wall an opening, there being at least one constant sized key way on the exterior surface which follows said surface of said hemispherical base, said key way being located below the mold cavity, said exterior surface of the hemispherical base being capable of engaging and mating with a guide key in the hemispherical shaped locating ring of a lens generating lathe said mold when so engaged and mated with said guide key defines by said key way and guide key means for lateral transposition of said mold whereby the optic center of said mold can be moved as desired out of the center of rotation of said lens generating lathe.

2. The mold of claim 1 wherein the mold has four key ways.

3. The mold of claim 1 wherein the mold has two key ways.

4. The mold of claim 1 wherein the mold is for casting contact lens blanks.

5. The mold of claim 4 wherein the optical surface is for a toric correction.

6. The mold of claim 4 wherein the optical surface is for a bifocal correction.

7. The mold of claim 4 wherein the optical surface is for a combined bifocal and toric correction.

8. The mold of claim 4 wherein the optical surface is for an aspheric correction.

9. The mold of claim 4 wherein the optical surface is for an optical correction employing two or more concentric curves.

10. The mold of claim 4 wherein the optical surface is for an optical correction which terminates with an upwardly curving junction with the molding cavity vertical side wall.

11. The mold of claim 1 wherein the mold is for casting intraocular lens blanks.

12. A method of manufacturing contact lenses which comprises polymerizing a contact or intraocular lens blank in a mold, inserting the mold containing the lens blank through the work spindle of the lathe and directy against the concentric hemispherical locating ring of a lens generating lathe and maintaining the mold against said ring while cutting the desired anterior lens surface on the lens blank, said mold comprising a hollow hemispherical base having attached to the apex (or the axis of the hemisphere perpendicular to the open edge of the interior hollow of said hemisphere) thereof a cup-like molding cavity with surface in the bottom thereof having a curvature opposite the optical surface desired in the lens being prepared, a vertical side wall extending from said bottom and at the other end of said side wall an opening, there being at least one constant sized key way on the exterior surface which follows said surface of said hemispherical base, said key way being located below the mold cavity, said exterior surface of the hemispherical base being capable of engaging and mating with a guide key in the hemispherical shaped locating ring of a lens generating lathe, said mold when so engaged and mated with guide key defines by said key way and guide key means for lateral transposition of said mold whereby the optic center of said mold can be moved as desired out of the center of rotation of said lens generating lathe.

13. The method of claim 12 wherein the mold is manually inserted into the lathe.

14. The method of claim 12 wherein the mold is automatically inserted into the lathe by air pressure and afterwords removed by use of vacuum.

* * * * *